(12) United States Patent
Foster et al.

(10) Patent No.: US 12,743,731 B2
(45) Date of Patent: Sep. 22, 2026

(54) SYSTEMS AND METHODS FOR INCREASED TRANSPARENCY OF PROTECTED INFORMATION

(71) Applicant: Simply Calmply LLC, Edmond, OK (US)

(72) Inventors: Curt Foster, Edmond, OK (US); Chris Foster, Edmond, OK (US); James Foster, Oklahoma City, OK (US)

(73) Assignee: Simply Calmply LLC, Edmond, OK (US)

( * ) Notice: Subject to any disclaimer, the term of this patent is extended or adjusted under 35 U.S.C. 154(b) by 586 days.

(21) Appl. No.: 18/324,654

(22) Filed: May 26, 2023

(65) Prior Publication Data

US 2023/0385971 A1 Nov. 30, 2023

Related U.S. Application Data

(60) Provisional application No. 63/365,397, filed on May 26, 2022.

(51) Int. Cl.

| | |
|---|---|
| ***H04W 4/029*** | (2018.01) |
| ***G06Q 50/26*** | (2012.01) |
| ***H04W 4/02*** | (2018.01) |
| ***H04W 4/70*** | (2018.01) |

(52) U.S. Cl.
CPC ............ *G06Q 50/26* (2013.01); *H04W 4/023* (2013.01); *H04W 4/70* (2018.02)

(58) Field of Classification Search
CPC ......... H04W 4/023; H04W 4/70; G06Q 50/26
See application file for complete search history.

(56) References Cited

U.S. PATENT DOCUMENTS

| | | | | |
|---|---|---|---|---|
| 6,529,831 | B1 * | 3/2003 | Smith | G08G 1/0965 342/455 |
| 11,837,115 | B1 * | 12/2023 | St Clair | B60R 7/046 |
| 2006/0041373 | A1 * | 2/2006 | Rowe | G01C 21/3608 701/532 |
| 2013/0023229 | A1 * | 1/2013 | Messerly | H04W 4/023 455/404.2 |
| 2022/0027637 | A1 * | 1/2022 | Madden | G08B 13/19645 |
| 2022/0277279 | A1 * | 9/2022 | Woo | G06Q 30/0284 |

(Continued)

*Primary Examiner* — Dai Phuong
(74) *Attorney, Agent, or Firm* — Dunlap Codding, P.C.

(57) ABSTRACT

A system and method are herein disclosed. The system comprising: a processor and a memory. The memory comprising a non-transitory computer-readable medium storing executable instructions that when executed by the processor causes the processor to: receive an encounter identifier from an officer using an officer device; determine a driver account based on the encounter identifier; send, to a driver device, a signal indicative of an encounter, a request for one or more context information, and an officer profile for the officer using the officer device; receive, from a driver using the driver device, a driver response wherein the driver response includes the one or more context information and a request to release a driver profile having private driver information to the officer using the officer device; and transmit, to the officer device, at least a portion of the context information and the driver profile associated with the driver.

20 Claims, 4 Drawing Sheets

(56) References Cited

U.S. PATENT DOCUMENTS

2023/0103625 A1* 4/2023 Burrell .................. G06Q 50/26 705/325
2023/0153796 A1* 5/2023 Higgs ................ G06Q 20/3674 705/66

* cited by examiner

SYSTEMS AND METHODS FOR INCREASED TRANSPARENCY OF PROTECTED INFORMATION

CROSS-REFERENCE TO RELATED APPLICATIONS

The present application claims priority to Provisional Patent Application U.S. Ser. No. 63/365,397 titled "SYSTEMS AND METHODS FOR INCREASED TRANSPARENCY OF PROTECTED INFORMATION" filed on May 26, 2022, the entire content of which is hereby expressly incorporated herein by reference in its entirety.

TECHNICAL FIELD OF THE INVENTION

This disclosure relates to an accountability system to aid in transparency between drivers and law enforcement officials, and, more generally, to aid in transparency between individuals and any enforcement personnel.

BACKGROUND OF THE INVENTION

Police officers and drivers have had a long history of confrontational encounters. National media attention regarding violent encounters between law enforcement and drivers is prevalent in today's society. Some encounters between drivers and law enforcement result in wrongful arrests, profiling, lawsuits, and even death.

Heightened anxiety and lack of information about drivers may cause police officers to react in fear and brutality. Police officers often put their lives on the line and because of the risk involved in their profession they are often cautious when approaching drivers and other citizens. In some interactions, the police officer feels threatened and is more likely to use force to defuse a situation. Likewise, fear of safety, brutality, and being treated unfairly may cause drivers to react in ways that invite the very treatment they are trying to avoid.

Therefore, a need exists for a system and method to provide additional information to police officers and to drivers during an encounter to facilitate non-confrontational exchange of information thereby reducing encounter anxiety and reducing or preventing brutal encounters.

There is a further need to provide a system and method to provide transparency about police encounters thereby improving the relationship between law enforcement and civilians.

SUMMARY OF THE INVENTION

The problem of providing additional information to police officers and to drivers during an encounter is solved by an intermediary system comprising: at least one processor and a memory. The memory comprising a non-transitory computer-readable medium storing computer-executable instructions that when executed by the at least one processor causes the at least one processor to: receive an encounter identifier from an officer using an officer device; determine a driver account based at least in part on the encounter identifier; send, to a driver device, a signal indicative of an encounter, a request for one or more context information, and an officer profile for the officer using the officer device; receive, from a driver using the driver device, a driver response wherein the driver response includes the one or more context information and a request to release a driver profile having private driver information to the officer using the officer device; and transmit, to the officer device, at least a portion of the context information and the driver profile associated with the driver.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
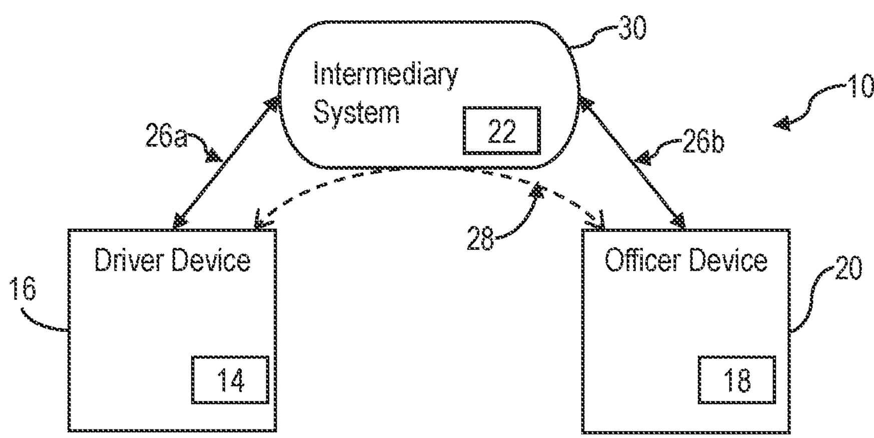
FIG. 1 is a functional diagram of an exemplary embodiment of an accountability system constructed in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description, and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure, or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

A programming language is a set of commands, instructions, and other syntax used to create software. Languages that programmers use to write code are called "high-level languages." High-level language code, which is designed to be read and understood by programmers, is compiled into a "low-level language," which is recognized directly by the computer hardware as computer readable instructions. This allows programmers to write source code in a more natural fashion, using logical words and symbols. Examples of high-level languages include C++, Java, Perl, and PHP. Low-level languages include assembly and machine languages.

Software may include one or more computer readable instructions that when executed by one or more components cause the component to perform a specified function. It should be understood that the algorithms described herein may be stored on one or more non-transitory computer-readable medium. Exemplary non-transitory computer-readable mediums may include random access memory, read only memory, flash memory, and/or the like. Such non-transitory computer readable mediums may be electrically based, magnetically based, optically based, and/or the like. Software modules are reusable portions of computer-executable code having one or more specific functions.

Figure 2:
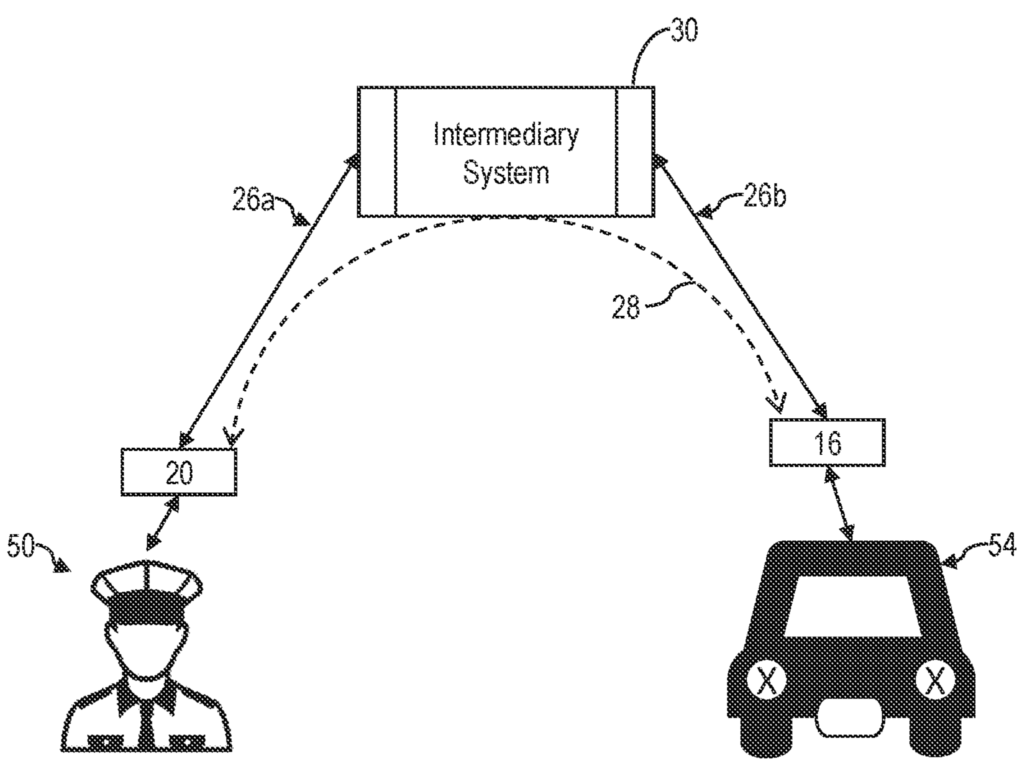
FIG. 2 is another functional diagram of an exemplary embodiment of the accountability system of FIG. 1 as used in accordance with the present disclosure.

Referring now to the drawings, and in particular to FIG. 1 and FIG. 2 in combination, in FIG. 1 is a functional diagram of an exemplary embodiment of an accountability system 10 constructed in accordance with the present disclosure. In the most general form, the accountability system 10 comprises at least a driver apparatus 14, an officer apparatus 18, and an intermediary apparatus 22 communicably coupled to, and operable to facilitate information exchange between, the driver apparatus 14 and the officer apparatus 18.

In one embodiment, the driver apparatus 14 may be a software module executing on a driver device 16. The driver device 16 may be a user device 128 (discussed in more detail below) such as one or more of a desktop computer, a laptop computer, a tablet, a phablet, a cellular telephone, a smart phone, a vehicle entertainment/infotainment system, and/or the like. The driver device 16 will generally include one or more input, such as a keyboard, touchscreen, microphone, camera, and/or the like, and one or more output, such as a speaker, an LED/LCD screen, a touchscreen, a haptic output, and/or the like. The driver device 16 may include a networking module operable to connect to a network 124, as described in more detail below.

The driver apparatus 14 may communicate with the intermediary apparatus 22 via one or more communication path 26*a* established between the driver apparatus 14 and the intermediary apparatus 22. The one or more communication path 26*a* may be established via the network 124 (discussed in more detail below).

In one embodiment, the officer apparatus 18 may be a software module executing on an officer device 20. The officer device 20 may be a user device 128 (discussed in more detail below) such as one or more of a desktop computer, a laptop computer, a tablet, a phablet, a cellular telephone, a smart phone, and/or the like. The officer device 20 will generally include one or more input, such as a keyboard, touchscreen, microphone, camera, and/or the like, and one or more output, such as a speaker, an LED/LCD screen, a touchscreen, a haptic output, and/or the like. The officer device 20 may include a networking module operable to connect to the network 124, as described in more detail below.

The officer apparatus 18 may communicate with the intermediary apparatus 22 via one or more communication path 26*b* established between the officer apparatus 18 and the intermediary apparatus 22. The one or more communication path 26*b* may be established via the network 124.

In one embodiment, the intermediary apparatus 22 may be a software module executing on an intermediary system 30, described below in detail. The intermediary apparatus 22 may create and mediate a communication path 28 between the officer apparatus 18 and the driver apparatus 14.

In one embodiment, the intermediary apparatus 22 may receive a first signal from the officer apparatus 18, identify a particular one of a driver apparatus 14 based on the first signal from the officer apparatus 18, and transmit, to the driver apparatus 14, one or more second signal indicative of the first signal.

Shown in FIG. 2 is a functional diagram of an exemplary embodiment of the accountability system 10 in use. Generally, an officer 50, e.g., a police officer or other law enforcement officer, may first decide to pull over, stop, or otherwise interact with, a driver 54. Once the officer 50 and the driver 54 are able to use a user device 128 (see FIG. 4), the officer

50 may use the officer device 20 to connect to the intermediary system 30, while the driver 54 may, simultaneously for example, use the driver device 16 to connect to the intermediary system 30.

In one embodiment, before an in-person interaction between the officer 50 and the driver 54, the intermediary system 30 may facilitate communication of information between the officer and the driver 54 via the communication path 28 as described below in detail.

Figures 3, 4:
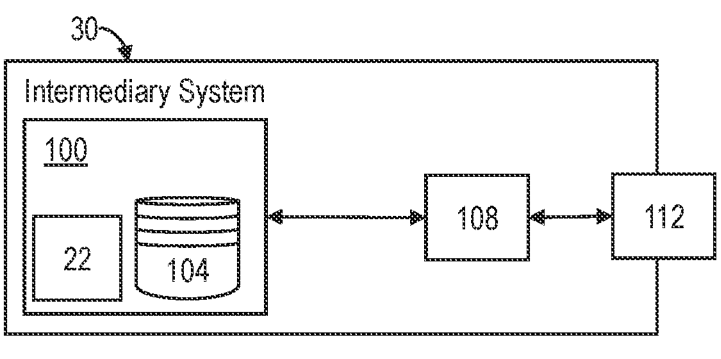
FIG. 3 is a diagram of an exemplary embodiment of an intermediary system constructed in accordance with the present disclosure.
FIG. 4 is a component diagram of an exemplary embodiment of the accountability system constructed in accordance with the present disclosure.

Referring now to FIG. 3, shown therein is a diagram of an exemplary embodiment of the intermediary system 30 constructed in accordance with the present disclosure. The intermediary system 30 generally includes one or more memory 100 storing the intermediary apparatus 22 and a database 104, one or more processor 108, and one or more network component 112.

The memory 100 is a non-transitory computer-readable medium storing computer-executable instructions, such as, software modules, that when executed by the processor 108, causes the processor 108 to perform one to more function. The memory 100 may include more than one memory 100 at one or more location such as in a server system described below in more detail.

The processor 108 may include one or more processor 108 located at one or more location working independently or together, such as in a server system described below in more detail. The processor 108 may be a processor, microprocessor, microcontroller, embedded processor, digital signal processor, media processor, FPGA, ASIC, and/or the like. The processor 108 may be communicably coupled to the memory 100 and the network component 112. The processor 108, being communicably coupled to the memory 100, may access the memory 100 to execute one or more function or task of the intermediary apparatus 22 as herein described.

In one embodiment, the intermediary apparatus 22 may be a software module executing within the intermediary system 30 at a location different from the officer device 20 and the driver device 16. The intermediary apparatus 22 may include and/or communicate with the one or more database 104 operable to store one or more officer account and one or more user account.

In one embodiment, the driver 54 may use the driver apparatus 14, e.g., via the driver device 16, to communicate with the intermediary apparatus 22 on the intermediary system 30. The driver 54 may use the driver apparatus 14 to setup a driver account with the intermediary apparatus 22. The driver account may include an account ID and one or more property such as driver information, registration information, insurance information, interaction history, and/or the like. Each of the one or more property may be either a required property or an optional property. One or more example required property may include a driver name and at least one vehicle having a tag information as described below.

In one embodiment, the driver apparatus 14 may provide an interface for the driver to view and/or set one or more property of their driver account stored in database 104 of the intermediary apparatus 22. For example, the driver apparatus 54 may provide an interface for the driver 54 to view and/or set their name, gender, ethnicity, occupation information, number of children, disabilities and other health information, if any, marijuana medical card information, educational data, the number of vehicles the driver 54 owns or drives and a vehicle profile for each vehicle including, for example, registration information, tag information, a VIN, and insurance information, insurance information for the driver 54, e.g., for when the driver is driving a vehicle the driver does not own, and any other information that the driver 54 may desire to present to the officer 50 such as whether the driver 54 lends their car to a student driver or driver on a temporary permit, for example.

Additionally, in some embodiments, the driver 54 may view and/or edit their email address, phone number, home and/or work address, and password. In some embodiments, the driver 54 may further view and/or edit identifying information such as a driver's license, a concealed carry license, a passport, a state ID, and/or the like. In some embodiments, the driver 54 may upload one or more image to the intermediary system 22, such as an image of a driver's license, an image of a concealed carry license, an image of the insurance card, an image of the driver 54, and/or the like. In one embodiment, the tag information entered by the driver 54 may be confirmed by the driver by uploading an image of the tag on the vehicle.

In one embodiment, the intermediary apparatus 22 may associate the information provided by the driver 54, such as the identifying information and/or images corresponding with the identifying information for example, with the account ID corresponding to the driver 54 within the database 104.

In one embodiment, the intermediary apparatus 22 may generate one or more notification by comparing the information provided by the driver 54 to current information. For example, the intermediary apparatus 22 may compare a date from the identifying information (or extracted from the identifying information) to the current date or intermediary system 30 time. The date may include an expiration date (optionally, extracted) from the driver's license, concealed carry license, passport, state ID, and/or the like.

In one embodiment, the intermediary apparatus 22 may send the one or more notification to the driver 54, e.g., via the driver apparatus 14 of the driver device 16. The one or more notification may be indicative of outdated driver information and may again provide the interface for the driver 54, as described above, to view and/or set one or more property of their driver account stored in database 104 of the intermediary apparatus 22. The intermediary apparatus 22 may further cause the interface to include one or more link to a third-party system to assist the driver 54 in accessing and/or updating the driver information or vehicle information. For example, if the driver's license of the driver information is expired, the intermediary apparatus 22 may cause the interface to include a link to a third-party system that provides driver's license renewals or other department of motor vehicles services. Similar links to third-party systems may be provided to insurance companies if insurance information is expired, tag agencies or DMVs if tag information is expired, medical marijuana licensors if a medical marijuana information is expired, and/or the like.

Similarly, in one embodiment, the officer 50 may use the officer apparatus 18 to communicate with the intermediary apparatus 22 on the intermediary system 30. The officer 50 may use the officer apparatus 18 to setup an officer account with the intermediary apparatus 22. The officer account may include an officer account ID and one or more property such as an officer name, officer badge number, officer jurisdiction, an image of the officer, the officer's supervisor's name, the officer's assigned location, department, or precinct, and/or the like. The officer account may further include officer information such as officer title (such as supervising officer, trainer officer, and trainee officer, as detailed below) and officer rank.

In one embodiment, the officer apparatus 18 may provide an interface for the officer 50 to view and/or set one or more property of their officer account stored in the database 104 of the intermediary apparatus 22. In other embodiments, the officer's supervisor and/or other administrator for the officer's police department having an officer administrative account, may access the officer apparatus 18, or otherwise communicate with the intermediary apparatus 22, to view, edit, and/or set one or more property of each officer account for any officer 50 over whom the administrator or supervisor has authority. For example, in use, the administrator having the officer administrative account may setup all officer accounts over whom the administrator has authority, such that the officer 50, when the officer 50 logs into the officer apparatus 18, can view, but not modify, one or more of the officer properties.

In this way, the intermediary apparatus 22 of the intermediary system 30 has access to private information of each of the driver 54 and the officer 50, however, neither of the driver 54 nor the officer 50 has access to the private information of the other unless or until that information is approved to be transmitted to the other party.

For example, while the intermediary apparatus 22 may have access to the driver's license and/or insurance of the driver 54, that information is not released to the officer 50 until the driver 54 has allowed the officer 50 to access that information. Additionally, in some embodiments, the intermediary apparatus 22 may limit certain information about the officer 50 from the driver 54 until after any in-person interaction—for example, the intermediary apparatus 22 may limit access to an officer rating until after an interaction with the officer 50 in order to limit bias towards the officer 50 prior to the encounter, which may result in a more confrontational interaction.

In one embodiment, one or more of the driver apparatus 14 and/or the officer apparatus 18 operate within the intermediary system 30 and are accessible, e.g., via the network component 112, by the driver device 16 and the officer device 20 respectively. For example, the driver 54 using the driver device 16 may access the intermediary system 30, and, upon successfully logging in, e.g., by entering in a username and password or other login method, may be presented, such as via a webpage, with the driver apparatus 14 on the driver device 16. Likewise, the officer 50 using the officer device 20 may access the intermediary system 30, and, upon successfully logging in may be presented, such as via a webpage, with the officer apparatus 18 on the officer device 20.

Referring back to FIG. 1 and FIG. 2, after the encounter has begun, the officer 50 may utilize the officer device 20 to access the officer apparatus 18. The officer apparatus 18 may present a user interface to the officer on a screen of the officer device 20 such that the officer 50 may input an encounter identifier, such as a form of identification of the vehicle that has been pulled over. For example, the officer 50 may enter a vehicle tag (i.e., encounter identifier) into the officer apparatus 18 interface and submit the encounter identifier to the intermediary apparatus 22. The intermediary apparatus 22 may then access the database 104 to determine a driver account having that tag information. Having found the driver account having the tag information, the intermediary apparatus 22 may send a notification to the driver 54 via the driver apparatus 14 informing the driver 54 that the officer 50 has pulled the driver 54 over and ask the driver 54 for context information to provide to the officer 50, such as with a context questionnaire. In one embodiment, the notification sent to the driver 54 may further include an alert if driver information or vehicle information is out of date. For example, if the driver account has a tag information or an insurance information that is out of date, the notification sent to the driver 54 may include an alert that the tag information is out of date (e.g., that the tag has expired or that insurance has expired) and/or an alert that the driver information is out of date (e.g., that the driver's license has expired, or that insurance has expired). In one embodiment, the notification sent to the driver 54 may be triggered by a reminder manually entered by the driver 54, as described below in relation to FIG. 6.

In one embodiment, when the intermediary apparatus 22 does not find a driver account corresponding to the encounter identifier, i.e., the tag information, the intermediary apparatus 22 may cause the intermediary system 30 to transmit a signal to the officer device 20, e.g., via the officer apparatus 18, indicating that the driver whom the officer 50 has pulled over, is not using the accountability system 10. In some embodiments, the signal indicating that the driver is not using the accountability system 10 may encourage the officer 50 to remain calm during the interaction and to inform the driver of the accountability system 10.

In some embodiments, such context information may include information that the officer may have a desire to know prior to approaching the vehicle and that would provide the officer with additional context. For example, context information may be asked in the form of a context questionnaire via an interface on the driver device 16. Predetermined context questions may be presented to the driver 54 to answer, such as "Are you being pulled over?"; "Are there any children in the vehicle?"; "How many children are in the vehicle?"; "Is there a gun in the vehicle?"; "Are you in possession of a weapon?"; "Are you the driver?"; "Is there a baby on board?"; and/or the like.

In one embodiment, once the driver 54 has submitted the context information, the driver 54 may be presented with an informational screen including the officer's name and badge number, so that the driver 54 knows who to expect to approach, and a reminder to keep calm. In some embodiments, the driver 54 may further be presented with an image of the officer, an option to quick-dial 9-1-1, an option to quick-dial the officer's police department, an option to quick-dial an attorney or an attorney/legal service, and/or the like. In some embodiments, the driver 54 is further presented with quick actions, such as an option to turn on the phone's camera or audio recorder to record the encounter. Additional quick actions may include, for example, an option to quick-dial a predetermined contact, such as a parent/guardian, e.g., for a minor driver, and another contact such as an emergency contact. For example, when setting up the driver account, the driver 54 may provide one or more predetermined contact and identify the predetermined contact as one or more of a parent/guardian, emergency contact, medical contact, or the like. When the driver 54 is a minor driver, the intermediary apparatus 22 may require that the driver 54 provide a parent/guardian contact information during account creation. The parent/guardian contact information may be verified with the parent/guardian, either through the parent/guarding providing a confirmation through their user device 128 executing the driver apparatus 14 or through a text-message or email-message confirmation, for example.

Further quick actions may include a quick action to purchase insurance (e.g., if the insurance information provided in the vehicle information or the driver information has lapsed) or a quick action to contact support resources, e.g., warrant assistance resources if the driver 54 has an active warrant as determined by the intermediary system 30 accessing third-party services, such as a court docketing system, court records system, a law enforcement telecoms system, a national crime information center system, and/or the like.

In one embodiment, when the quick action to purchase insurance is selected by the driver 54, the intermediary system 30 may communicate with one or more insurance provider (e.g., via the network 122 by the network component 112) to request an instant quote for the driver 54. Because the driver 54 has already entered in the driver information, when the intermediary system 30 requests the instant quote from an insurance provider, the intermediary system 30 may provide the driver information in order to receive the quote. In one embodiment, the one or more insurance provider is a predetermined insurance provider offering to provide instant insurance to drivers 54 via the intermediary system 30.

In one embodiment, when the quick action to contact support resources, e.g., warrant assistance resources, is selected by the driver 54, the intermediary system 30 may retrieve one or more support resource contact information for the driver 54 based on the driver location (e.g., a coordinate location of the driver device 16, such as provided by a positioning service including cell phone triangulation and/or satellite positioning). The driver location may be used to determine one or more support resource having an operating area encompassing the driver location. The driver may then be provided with a list of support resources (and contact information of the support resources) available nearby or may be provided with contact information with the nearest support resource, which may be loaded into a dialer, such as the calling app of the phone.

In one embodiment, the intermediary system 30 may access one or more third-party services via the network 124 with the network component 112. For example, the intermediary system 30 may access one or more API for the one or more third-party service. The one or more third-party service may include, for example, the court docketing system, the court records system, the law enforcement telecoms system, the national crime information center system, and/or the like.

In one embodiment, when one of the quick-dial options is selected, the driver apparatus 14 may cause the driver device 16 to prefill the relevant phone number into a cell phone for the driver 54 to call the number associated with the quick-dial option, or, in some embodiments, may cause the driver device 16 to initiate communication with the selected quick-dial option, e.g., via a telephone service, a virtual phone service, a video conferencing service, a VoIP service, a texting service, a messaging service, any web-based communication service, or the like, or some combination thereof.

In one embodiment, when the driver 54 indicates that the driver 54 is not in an encounter with the officer 50, e.g., responds in the negative to the prompt "Are you being pulled over?", the intermediary apparatus 22 may inform the driver 54 that the officer 50 has entered in an encounter identifier corresponding to the tag information of the driver's vehicle. Additionally, or alternatively, the intermediary apparatus 22 may inform the officer 50 that the driver 54 corresponding to the encounter identifier, i.e., the driver 54 having the vehicle with the tag information corresponding to the encounter identifier, has indicated that they are not present in the vehicle that the officer 50 has pulled over. In some embodiments, when the driver 54 indicates that they are not being pulled over by the officer 50, the driver 54 is asked whether the driver 54 knows the location of the driver's vehicle and this information may be transmitted to the officer 50 via the intermediary system 30. In yet another embodiment, the driver 54, having indicated that the driver 54 does not know the location of the vehicle, may be presented, e.g., on the driver device 16 via the driver apparatus 14, with an option to indicate, to the officer 50, that the vehicle has been stolen or is otherwise being used without authorization.

In one embodiment, the administrator may establish a set of predetermined questions that will be presented to any driver 54 that is pulled over by an officer 50. In this way, any driver 54 pulled over within a particular jurisdiction will be asked the same questions, thereby providing officers 50 with expected context information to help normalize interactions with drivers 54 and to help lower officer anxiety during the interaction through providing consistent information in a consistent format.

In some embodiments, the intermediary apparatus 22 may transmit to the driver apparatus 14 of the driver device 14 of the driver 54 an encounter questionnaire having one or more encounter question. Each encounter question may be one or more of a multiple-choice question, a Likert-scale question, a checkmark response, and/or a free response question, for example. Exemplary encounter questions may include "What was the outcome of engaging with the officer?"; "Was the engaging officer in uniform?"; "Did the officer use language that was racist, sexist, juvenile, or otherwise unprofessional?"; "Did the officer conduct an inspection of your vehicle?"; "Did the Officer use language that was harsh, violent, or profane?"; "Did the Officer make physical contact with you that seemed inappropriate or would be considered as force?"; and "How was your overall Experience?" and/or the like. Another exemplary encounter question may include "What was the overall tone of your officer?" with selectable answers such as "Professional", "Disrespectful", or "Normal", for example. In one embodiment, the driver 54 may be presented with an encounter question, e.g., a free response question, asking the driver 54 to "Commend your Officer", where, if the driver 54 completes the free response question, the officer 50 may receive at least a portion of the response. In some embodiments, the response may be anonymized prior to receipt by the officer 50.

In one embodiment, the encounter questionnaire further includes a file upload question asking the driver 54 to upload one or more file to the intermediary system 30. For example, the file upload question may ask the driver 54 to upload a warning, ticket, or citation that the driver 54 received during the encounter. If the driver 54 completes the file upload question, the driver 54 may be provided with further resources, including an option to quick-dial an attorney or an attorney service, as described above, or a link to government resources, such as a payment portal to pay the citation or to setup a payment plan to pay the citation.

In one embodiment, when a first officer is already present at an encounter and a second officer arrives, the second officer may access, or otherwise log into the officer apparatus 18, enter the encounter identifier, such as the tag of the vehicle, and the intermediary apparatus 22 will link the second officer to the encounter such that the driver 54 is made aware of the second officer's information such as the second officer's name, badge number, etc. In one embodiment, after the encounter, the driver 54 may be requested to complete two encounter questionnaires, a first questionnaire for the first officer and a second questionnaire for the second officer. In another embodiments, after the encounter, the driver 54 may be presented with a first set of one or more encounter questions regarding the encounter overall, a second set of one or more encounter questions regarding the first officer specifically, and a third set of one or more encounter questions regarding the second officer specifically.

In one embodiment, when a first officer and a second officer are riding together, one or more of the first officer, the second officer, and/or the officer administrator, may indicate, e.g., via the officer apparatus 18, that the first officer and the second officer are working in tandem and may link the first officer and the second officer together, e.g., link the officer account for the first officer and the officer account for the second officer, for a particular shift or other period of time. For example, a trainee officer may be linked to a trainer officer for a particular shift or for a particular probationary period. In this embodiment, if either of the first officer and the second officer enter the encounter identifier into the officer apparatus 18, such as the tag of the vehicle, the intermediary apparatus 22 will automatically associate both the first officer and the second officer to the encounter. Further, the driver 54 is made aware, e.g., via the driver device 16, of both the first officer's information and the second officer's information as described above, and, in the case of a trainee officer and a training officer, may be notified which officer is the training officer. In this embodiment, after the encounter, the driver 54 may also be requested to complete two encounter questionnaires, a first questionnaire for the first officer and a second questionnaire for the second officer, as described above.

In one embodiment, the intermediary system 30 may further provide for a contactless-citation. For example, the officer 50 using the officer device 20 may access the officer apparatus 18 to generate a citation (e.g., a ticket, a warning, a parking citation, a code violation citation, a moving violation citation, and/or the like). The citation may be generated based on the driver information, the officer information, and one or more input from the officer regarding an alleged infraction. The citation may be provided in the intermediary system 30. The citation may be transmitted to the driver 54 via the driver apparatus 14 of the driver device 16. In one embodiment, the driver 54 may provide an acknowledgement that the driver 54 has received the citation. The driver apparatus 14 may provide the driver 54 one or more input to provide notes or feedback regarding the citation, e.g., to establish a present sense impression of the encounter and the citation. In this way, the officer 50 may not have to interact with the driver 54 in-person, and may interact via the accountability system 10.

It is understood that the present disclosure is not limited to only an officer-driver encounter and may be used for other situations where an officer and a civilian may desire to share additional information before an in-person encounter to better understand a situation prior to fully engaging, in-person, with the other party. For example, the accountability system 10 may be used between an attendee at a concert and a security personnel, a traveler and a TSA agent, and the like. A person having skill in the art would readily appreciate other situations where the disclosed accountability system would be advantageous.

Referring now to FIG. 4, shown therein is a diagram of an exemplary embodiment of the accountability system 10 constructed in accordance with the present disclosure. In one embodiment, accountability system 10 may include one or more intermediary system 30. The intermediary system 30 may comprise one or more computer processor 108, and one or more memory 100 as described above. As shown in FIG. 4, the computer processor 108 may include (or be communicatively coupled with) the network component 112. The memory 100 may store data, for example, in the one or more database 104 and include one or more software 120 such as the intermediary apparatus 22, and, for example, when implemented as a network application, at least a portion of the driver apparatus 14 and/or the officer apparatus 18. The intermediary system 30 may be coupled to and/or include the network 124 enabling bidirectional communication between the processor 108 and the non-transitory memory 100 with a plurality of user devices 128. The user devices 128 may communicate via the network 124 and/or may display information on a screen 132. The processor 108 or multiple processors 108 may or may not necessarily be located in a single physical location.

In one embodiment, the intermediary system 30 is communicably coupled to the one or more driver device 16 and/or officer device 20, e.g., user devices 128, via a network 124. In one embodiment, the network 124 is the Internet. It should be noted, however, that the network 124 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

The user device 128 has at least the display 132 as a visual feedback device, and an interface component 136, such as, by way of example only, a touch-screen component wherein the display 132 is combined with the interface component 136 such that the user may interact with the display 132 to interface with the user device 128. In one embodiment, the interface component 136 is any human interface device and may include a keyboard, a mouse, or the like. In other embodiments, the user device 128 may be in communication with one or more interface component 136 providing an interface through which a user may interact with the user device 128 by, for example, a speech interaction, a noise interaction, a touch interaction, and/or a movement interaction near the user device 128. In one embodiment, the display 132 and/or the user device 128 may include one or more of an auditory feedback device, a haptic feedback device, a somatosensory feedback device, and/or an olfactory feedback device. In one embodiment, the display 132 of the user device 128 is any output device and is not limited to, and in some embodiments is not, a visual display, such as an LCD or LED screen. In one embodiment, the user device is a dashcam, a headcam, a bodycam, and/or the like.

In one embodiment, the computer processor 108 and the memory 100 may be implemented with a server system 140 having multiple servers in a configuration suitable to provide a commercial computer-based business system such as a commercial web-site, a network application, and/or data center. For example, the server system 140 may have a first server located at a first geographic location and a second server located at a second geographic location where the first server and the second server are operable to communicate bidirectionally with each other and the first geographic location and the second geographic location are different locations.

Figure 5:
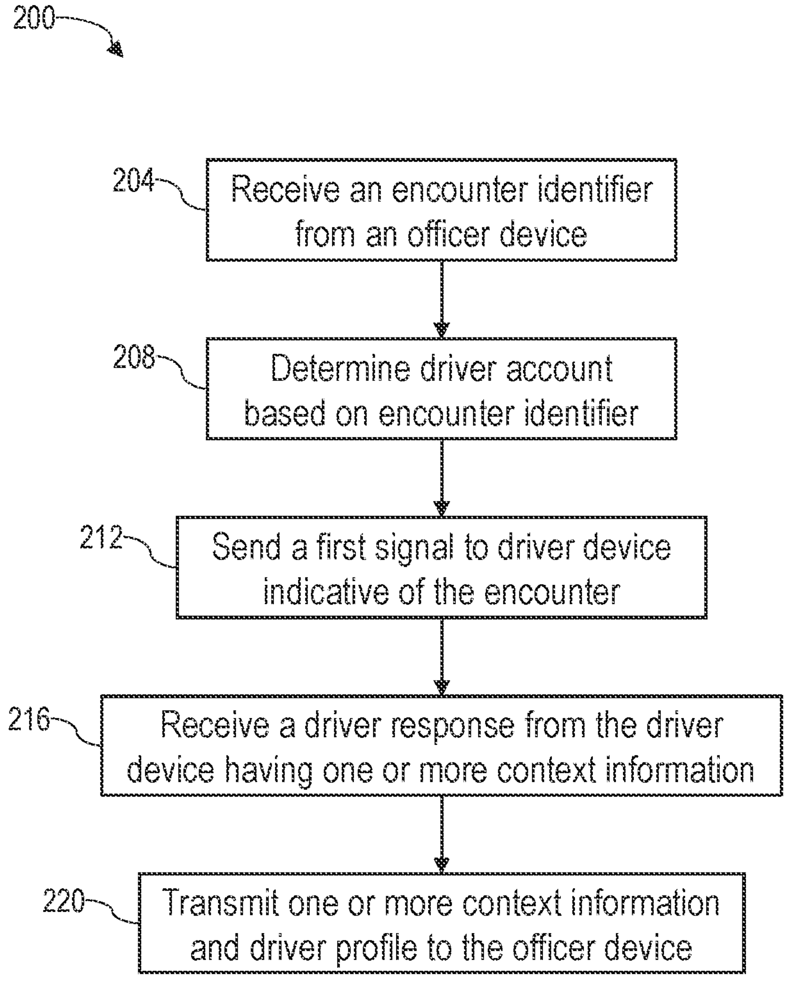
FIG. 5 is a process flow diagram of an exemplary embodiment of an accountability process in accordance with the present disclosure.

Referring now to FIG. 5, shown therein is a process flow diagram of an exemplary embodiment of an accountability process 200 in accordance with the present disclosure. The accountability process 200 generally comprises the steps of: receiving an encounter identifier from an officer device (step 204); determining a driver account based on the encounter identifier (step 208); sending a first signal to the driver device indicative of the encounter (step 212); receiving a driver response from the driver device (step 216); and transmitting one or more context information to the officer device (step 220). Generally, the accountability process 200 may be implemented as a software 120 stored in the memory 100 and executed by the processor 108.

In one embodiment, receiving an encounter identifier from an officer device (step 204) includes receiving by the intermediary system 30 an encounter identifier from the officer device 20. The encounter identifier may include, for example, any identifier of the driver that may be determined without an in-person interaction between the driver 54 and the officer 50. For example, the encounter identifier may be the tag information of the vehicle which the officer 50 has pulled over. The intermediary system 30 may store the encounter identifier, a time stamp, an officer account ID corresponding to the officer initiating an encounter and/or transmitting the encounter identifier, and/or the like, within the memory 100 and/or the database 104.

In other embodiments, the encounter identifier may be a vehicle identifier placed on the vehicle by the driver. For example, when the driver creates the driver account and inputs one or more vehicle, the driver may be presented with a unique vehicle identifier for each of the one or more vehicle. The driver may then associate, e.g., attach, affix, or display, either permanently or temporarily, the unique vehicle identifier of the vehicle to the vehicle. For example, the unique vehicle identifier may be a window sticker on the back window of the vehicle or a bumper sticker attached to the vehicle. In this embodiment, receiving an encounter identifier from an officer device (step 204) may include receiving the encounter identifier from the officer 50 where the encounter identifier is a unique vehicle identifier.

In one embodiment, receiving an encounter identifier from an officer device (step 204) may include receiving the encounter identifier from the officer 50 where the encounter identifier is a unique vehicle identifier associated with a third-party system. This may be advantageous for a driver 54 that is driving a rental vehicle, for example. In other embodiments, the intermediary system 30 may communicate with, e.g., via the network 124, the third-party system that may correlate a vehicle identifier of a rental vehicle with a particular driver, e.g., via a driver's license number, and transmit the driver information to the intermediary system 30 in order to identify the driver account as described below in more detail.

In one embodiment, receiving an encounter identifier from an officer device (step 204) may be performed automatically or semi-automatically from the officer device 20 and/or the driver device 16. For example, in one embodiment, where the driver device 16 and the officer device 20 include a near-field communication component or other short-range communication component, such as Zigbee, Z-wave, WIFI, and/or the like, the officer 50 may not be required to enter any encounter identifier into the officer device 20. Instead, the officer 50 is presented with an interface on the officer device 20 which prompts the officer to "begin" or "start" an encounter. Once selected the driver device 16 passes an encounter identifier, stored in non-transitory memory of the driver device 16, to the officer device 20. For example, when the driver 54 activates the driver device 16, the driver device 16 may transmit an encounter identifier, via the communication component and the officer device 20 can enable a communication component to scan for a nearby transmitted encounter identifier. Then, the officer 50 is presented with one or more vehicle profile based on the driver device 16 being within range of the officer device 20. Upon selection of the vehicle profile matching the vehicle pulled over, the officer device 20 may transmit the selected vehicle profile, or an identifier of the selected vehicle profile, to the intermediary system 30. In this way, receiving an encounter identifier from an officer device 20 (step 204) may include receiving the encounter identifier from the officer device 20 without the officer 50 knowing the encounter identifier. This embodiment may be particularly advantageous when the driver 54 is operating a rental vehicle, for example.

In one embodiment, receiving an encounter identifier from an officer device (step 204) may include receiving a notification indicative of the officer 50 initiating an encounter. In this embodiment, the intermediary system 30 may receive a notification that the officer 50 has initiated the encounter along with one or more location information from the officer 50, such as a coordinate location of the officer 50, e.g., GPS/GLONASS/Galileo coordinates from the officer device 20.

In one embodiment, receiving an encounter identifier from an officer device (step 204) may be performed prior to an in-person encounter between the officer 50 and the driver 54.

In one embodiment, receiving an encounter identifier from an officer device (step 204) further includes receiving from the officer device 20 or another user device 128 associated with the officer device 20, one or more video or audio feed. When the officer 50 transmits the encounter identifier via the officer device 20, the officer device 20 may cause another device to connect to the intermediary system 30 and to begin transmitting one or more video and/or audio stream to the intermediary system 30. For example, when the officer 50 transmits the encounter identifier, the officer device 20 may cause the officer's bodycam and/or dashcam to transmit one or more audio and/or video stream to the intermediary system 30. The intermediary system 30 may subsequently store the audio and/or video stream in the non-transitory memory 100, and associate the received one or more audio and/or video stream with a particular encounter initiated by the officer 50.

In one embodiment, receiving an encounter identifier from an officer device (step 204) further includes a unique event identifier from a third-party system. For example, when the officer 50 transmits the encounter identifier via the officer device 20, the officer device 20 may cause another device to begin recording and/or transmitting one or more audio and/or video stream to a third-party system. The third-party system may provide a unique event identifier to identify the one or more audio and/or video transmitted to the third-party system. The officer device 20 may then transmit, to the intermediary system 30, the unique event identifier and an identification of the third-party system such that a person having interest in a particular encounter can easily associate a recorded audio/video stream in a third-party system with the particular encounter.

In one embodiment, determining a driver account based on the encounter identifier (step 208) includes selecting by the processor 108 of the intermediary system 30 and from the database 104 storing driver accounts, one or more driver account associated with the encounter identifier.

In one embodiment, where the encounter identifier is a tag information, determining a driver account based on the encounter identifier (step 208) includes selecting from the database 104 one or more driver account associated with a vehicle having the tag information.

In one embodiment, where the encounter identifier is a location information and an indication that an officer 50 has initiated an encounter, determining a driver account based on the encounter identifier (step 208) includes determining a driver account associated with a driver device 16 located at (or geographically near or in close proximity to) the location where the officer has initiated the encounter, e.g., at the coordinate location of the officer 50.

In one embodiment, when a driver 54 has been pulled over, the driver 54 may indicate via the driver apparatus 14 on the driver device 16 that the driver 54 is a party to an encounter. In this embodiment, determining a driver account based on the encounter identifier (step 208) may include identifying a driver account currently party to an encounter and located at or near the location based on location information received from the officer device 16.

In one embodiment, where the vehicle is associated with a unique vehicle identifier, determining a driver account based on the encounter identifier (step 208) may include determining by the processor 108 the vehicle in the database 104 associated with the unique vehicle identifier.

In one embodiment, where the intermediary system 30 has received the encounter identifier indicative of a vehicle profile or an identifier of a vehicle profile, determining a driver account based on the encounter identifier (step 208) includes querying the database 104 to determine the driver account associated with the vehicle profile.

In one embodiment, one or more of the above embodiments to receive an encounter identifier and to determine a driver account based on the encounter identifier may be used together, either synchronously or asynchronously, to verify that a particular driver account is the actual account associated with the driver 54 of the vehicle that the officer 50 has pulled over.

In one embodiment, sending a first signal to the driver device indicative of the encounter (step 212) includes transmitting, via the network 124, a signal to the driver device 16 indicative of initiation of an encounter.

In one embodiment, sending a first signal to the driver device 16 indicative of the encounter (step 212) does not include sending one or more officer information, such as an officer profile, to the driver device 16.

In one embodiment, sending a first signal to the driver device indicative of the encounter (step 212) includes sending a signal indicative of initiation as well as a context questionnaire and an officer profile of the officer 50 initiating the encounter. In one embodiment, the first signal may cause the driver device 16 to display an encounter notification and a request to complete a context questionnaire, receive one or more context information from the interface of the driver device 16, display the officer profile on the driver device 16, and transmit from the driver device 16 to the intermediary system 30 the context information.

In another embodiment, sending a first signal to the driver device indicative of the encounter (step 212) includes sending a signal indicative of initiation of an encounter and the officer profile of the officer 50 initiating the encounter.

In one embodiment, receiving a driver response from the driver device (step 216) includes receiving, from the driver device 16, one or more context information from the driver 54.

In one embodiment, in response to receiving a driver response from the driver device (step 216), the intermediary system 30 may transmit to the driver device 16, the officer profile of the one or more officer 50 initiating the encounter.

In one embodiment, when the driver device 16 includes one or more camera, such as when the driver device 16 includes or is coupled to a dashcam or dashboard camera, receiving a driver response from the driver device (step 216) further includes receiving, from the driver device 16, one or more camera feed from the camera. For example, when the driver device 16 is a cell phone in communication with a dashcam having a front and rear camera, receiving a driver response from the driver device (step 216) may include receiving, by the intermediary system 30 one or more of a first video feed from the cell phone, a second video feed from the front camera of the dashcam, and a third video feed from the rear camera of the dashcam and storing each of the one or more video stream in the memory 100 such as in the database 104.

In one embodiment, when the driver device 16 includes one or more microphone, such as, for example, when the driver device 16 is a dashcam or cellular phone, receiving a driver response from the driver device (step 216) includes receiving one or more audio stream from the driver device 16. For example, when the driver device 16 is a cell phone in communication with another audio receiving device, receiving a driver response from the driver device (step 216) may include receiving by the intermediary system 30 one or more of a first audio stream from the cell phone and a second audio stream from another audio receiving device and storing each of the one or more audio stream in the memory 100 such as in the database 104.

In one embodiment, transmitting one or more context information to the officer device (step 220) includes transmitting one or more driver profile to the officer 50. In one embodiment, the one or more driver profile may include a name and image of the driver as well as driver information, such as information presented on a driver's license, i.e., an image of the driver's driver's license. The context information may further include a number of children currently in the vehicle, and in some embodiments an image of one or more of the children in the vehicle.

In some embodiments, transmitting one or more context information to the officer device (step 220) includes transmitting to the officer device 20 one or more medical information for the driver 54, or a passenger. While the following examples regarding medical information are directed to medical information of the driver 54, the examples are similarly applicable to passengers. Exemplary medical information includes real-time and current heart rate of the driver 50. The heart rate can be obtained from a device, such as a smart watch, configured to obtain the driver's heart rate. The heart rate information can be passed to the driver device 16, and then passed to the intermediary system 30. The heart rate of the driver 54 can be interpreted by the officer 50 to determine how calm or agitated the driver 54 is. In another example, the one or more medical information may include a medical alert based on the medical information. In one embodiment, the medical alert may be a sensory overload alert, such as, for example, if the driver 54 experiences sensory overload, which causes the driver 54 to react in a less-than-ideal manner. This may be advantageous for drivers 54 that have an autism spectrum disorder, for example. In another embodiment, the medical alert may be a hearing impairment alert, such as, for example, if the driver experiences a hearing impairment that interferes with the driver's ability to hear, understand, or follow instructions. The hearing impairment alert may be advantageous for drivers with a hearing impairment that causes a low word discrimination score, for example. In another embodiment, the medical alert may be a verbal impairment alert, such as, for example, if the driver 54 has a speech impediment or is unable to effectively verbally communicate that interferes with the driver's ability to communicate with others. The verbal impairment alert may be advantageous for drivers with a speaking impairment that limits the driver's ability to communicate. It is foreseeable that the medical alert may be specified for any medical condition that may impact the encounter and/or that the driver desires the officer to be aware of.

In one embodiment, transmitting one or more context information to the officer device (step 220) further includes causing the officer device 20 to provide an audible alert to the officer when the context information includes one or more predetermined contexts, such as, if the context information includes a medical alert.

In one embodiment, transmitting one or more context information to the officer device (step 220) further includes causing the officer device 20 to provide a visible alert to the officer indicative of the context information.

In one embodiment, transmitting one or more context information to the officer device (step 220) further includes causing the officer device 20 to provide a visible alert to the officer indicative of any medical alert and, in some embodiments, further causing the officer device 20 to require the officer 50 acknowledge that the officer 50 is aware of the particular medical alert context information, e.g., that the officer has received notice of the particular medical alert.

In one embodiment, transmitting one or more context information to the officer device (step 220) may further include transmitting to the officer device 20 one or more additional information such as a quick response displayed to the officer 50 when the context information includes particular information. For example, the driver 54 may indicate within the context information that the driver 54 is currently experiencing a mental health impairment, such as a panic attack. The intermediary system 30, when transmitting the one or more context information to the officer device 20, may also transmit to the officer device 20 a contact information for a social worker, with whom the driver 54 has identified they normally work. In other embodiments, when the context information includes any indication that the driver 54 is currently experiencing a mental health emergency, the intermediary system 30 may transmit to the officer device 20 a quick response to a local mental health team or specialist that may be able to assist in the situation and/or may transmit to the officer device 20 a notification indicating that it is suggested that the officer 50 call their dispatch or local department and request a mental health response team. Another example of a quick response displayed to the officer 50 may include a contact information for an emergency contact of the driver 54, e.g., if the context information includes a medical alert information for the driver 54 indicating the driver 54 may have communication difficulties. Similarly, a quick response displayed to the officer 50 may include a contact information for an emergency contact of a passenger, e.g., if the context information includes a medical alert information for the passenger indicating the passenger may have communication difficulties.

In one embodiment, the intermediary system 30, through each step of the accountability process 200 may record all encounter information, signals, responses, or other communications between the driver device 16 and the intermediary system 30 and the officer device 20 and the intermediary system 30. The recorded encounter information may be stored in the memory 100 and/or the database 104. The encounter information may further be assigned an encounter code to uniquely identify a particular encounter and all information or other data associated with the particular encounter including metadata such as user device locations, user device types, timestamps of all interactions with the intermediary system 30, timestamps of any interaction between the driver 54 and the driver device 16 or the officer 50 and the officer device 20, and/or the like.

In one embodiment, one or more of the driver 54, via the driver apparatus 14 of the driver device 16, or the officer 50, via the officer apparatus 18 of the officer device 20, may indicate that the encounter has concluded.

In one embodiment, after the encounter has concluded, the intermediary system 30 may send a second signal to the driver device 16 requesting the driver to complete an encounter questionnaire. In one embodiment, the intermediary system 30 may transmit the second signal immediately after the encounter is concluded to request that the driver 54 complete the encounter questionnaire. In another embodiment, the intermediary system 30 may transmit the second signal at a predetermined period of time after the encounter has concluded. The predetermined period of time may be, for example, 1 millisecond, 1 second, 5 minutes, 30 minutes, 1 hour, 4 hours, 12 hours, 1 day, 2 days, 1 week, 1 month, and/or any period of time therebetween. Other periods of time may be defined or selected by the driver 54 and/or by the administrator.

In one embodiment, the intermediary system 30 collects the encounter questionnaire responses and stores the questionnaire responses in the database 104 and associates the questionnaire responses with the driver's account ID, the officer account ID, and the encounter code.

In one embodiment, the accountability system 10 further includes a police dashboard. The police dashboard may be accessible by an officer administrator to view anonymized questionnaire responses collated into statistics for each officer 50. In one embodiment, the officer administrator may access the police dashboard and view how each officer 50 is rated on a particular component based on the demographics of the drivers 54 the officer 50 has initiated encounters with. For example, the officer administrator may access the police dashboard and query the database 104 to determine if any officer 50 within the officer administrator's department or jurisdiction has more than a 75% chance of a minority driver to report a particular officer may have been racially motivated to initiate the encounter and/or used racist language. In this way, the officer administrator may determine which officers 50, if any, need anti-discrimination training or pose a liability to the department, e.g., prior to an event that might make national news.

In one embodiment, the police dashboard further provides the officer administrator access to any unique event identifier of a third-party system such that the officer administrator may access additional encounter information, such as video/audio streams in the third-party system. For example, the unique event identifier may be associated with a particular bodycam recording that the officer administrator may use to find the recording in the respective system if the respective system is separate from the accountability system 10.

In one embodiment, the accountability system 10 further provides a public facing dashboard with information regarding data accumulated from all stops. The public facing dashboard may include information for all stops within a particular jurisdiction. In other embodiments, the public facing dashboard includes anonymized data such that driver identity and officer identity is not available.

In some embodiments, the accountability system 10 having the public facing dashboard permits a user to query an officer badge number and/or jurisdiction to determine encounter statistics for the officer 50 having the particular badge number. In some embodiments, statistics are not provided for any query where the number of results is below a predetermined threshold value. For example, if an officer 50 only has one recorded encounter, querying that officer's badge number and/or jurisdiction will not return any results. This is advantageous for at least two reasons: (1) having such a limited number of results does not allow for any accounting of statistically anomalies; and (2) having such a limited number of results is easily de-anonymized.

In one embodiment, the accountability system 10 having the public facing dashboard permits any user to access information that would otherwise be public information when requested directly from the respective police department but anonymizes any information that is not otherwise publicly available.

Figure 6:
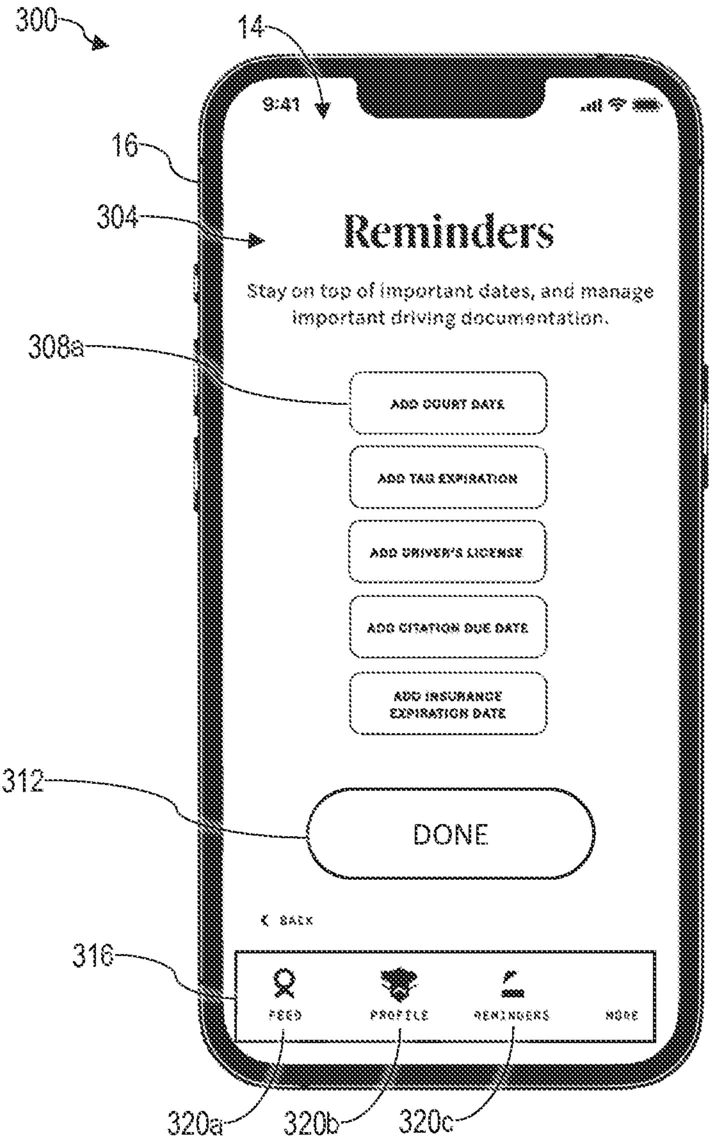
FIG. 6 is a screenshot of an exemplary embodiment of the driver apparatus constructed in accordance with the present disclosure.

Referring now to FIG. 6, shown therein is a screenshot 300 of an exemplary embodiment of the driver apparatus 14 on the driver device 16 constructed in accordance with the present disclosure. The driver device 16 may execute software to generate and display the driver apparatus 14. As shown, the driver device 16 has a processor programmed with the driver apparatus 14 may generate and provide signals to a screen to display to the driver 54 a reminder module 304. The reminder module 304 may display an option to setup one or more reminder 308*a-n*, such as an "add court date" reminder 308*a*. When a particular reminder 308*a-n* is selected, the processor of the driver device 16 may be programmed to provide to the screen one or more input to permit the driver 54 to enter reminder information such as a location, a date, a time, a frequency, a note, and the like. For example, when the reminder 308*a* is selected, the processor of the driver device 16 may be programmed to provide to the screen a date-time picker to permit the driver 54 to select a date and/or time and one or more input to receive data indicative of a courthouse, a courthouse location, a judge name, a courtroom number, a docket number, an attorney information, and/or the like or some combination thereof. Other reminders 308 may include an "add tag expiration" reminder, an "add driver's license expiration" reminder, an "add citation due date" reminder, and an "add insurance expiration date" reminder.

Each reminder may include information indicative of at least a reminder date. The processor of the driver device 16 may be programmed to provide to the screen of the driver apparatus 14 one or more notification based on the reminder date. For example, for a "add driver's license expiration" reminder having a reminder date, the processor of the driver device 16 may cause the driver device 16 to display a first notification at a first predetermined time prior to (or on) the reminder date (such as 30 days) and to display a second notification at a second predetermined time prior to the reminder date (such as 7 days). The first predetermined time and the second predetermined time may be provided by the driver 54, and/or may be prefilled predetermined times based on a reminder type, e.g., "add driver's license expiration" reminder may have different prefilled, predetermined time(s) than an "add citation due date" reminder.

In one embodiment, upon selection of the reminder 308 (such as the "add court date" reminder 308*a*, the processor of the driver device 16 may be programmed to provide to the screen a camera function operable to receive an input from the driver 54 to take an image of a court document. The processor of the driver device 16 may be programmed to process the image (with one or more image processor, optical character recognition system, or image analysis machine learning or artificial intelligence technique) to determine the reminder information and prefill the one or more input for the reminder information.

For example, if the reminder type is a "citation due date" reminder, the processor of the driver device 16 may process an image of a citation and extract relevant information, such as date, time, infraction, officer name, courthouse name, jurisdiction, a citation number/ID, an agency/department/precinct information, a due date, and/or the like, or some combination thereof.

In one embodiment, when the driver 54 enters the reminder information into the reminder module 304, the reminder information is saved to a memory, such as in a database, for example, the memory 100 and the database 104. In one embodiment, the reminder information is saved when the driver 54 selects an input 312. While the input 312 is labeled as "done", any other label may be supplied to the input 312. Selection of the input 312 may be indicative of the driver 54 completing setup of one or more reminder 308*a-n*.

In one embodiment, the processor of the driver device 16 may be programmed to display a menu 316 to the driver 54, wherein the menu 316 has one or more menu items 320*a-n*, such as a feed menu item 320*a*, a profile menu item 320*b*, a reminders menu item 320*c*, and the like. In one embodiment, each menu item 320 may cause the processor of the driver device 16 to display one or more module. For example, the menu 316 is displayed on the screen such that selection of the reminders menu item 320*c* causes the processor of the driver device 16 to display the reminder module 304.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. An intermediary system comprising:

at least one processor, and a memory comprising a non-transitory computer-readable medium storing computer-executable instructions that when executed by the at least one processor causes the at least one processor to:

receive an encounter identifier from an officer using an officer device and location information of the officer device;

determine a device location of a driver device in proximity to the location information;

determine a driver account based at least in part on the encounter identifier and by identifying the driver account associated with the driver device having the device location in proximity to the officer device;

send, to the driver device, a signal indicative of an encounter, a request for one or more context information, and an officer profile for the officer using the officer device;

receive, from a driver using the driver device, a driver response wherein the driver response includes the one or more context information and a request to release a driver profile having private driver information to the officer using the officer device; and transmit, to the officer device, at least a portion of the context information and the driver profile associated with the driver.

2. The intermediary system of claim 1, wherein receiving the encounter identifier further includes receiving a vehicle identifier.

3. The intermediary system of claim 2, wherein the memory further stores computer-executable instructions that cause the processor to:

determine the driver account based on the vehicle identifier being associated with the driver account.

4. The intermediary system of claim 2, wherein the vehicle identifier is a unique vehicle identifier associated with a third-party system.

5. The intermediary system of claim 4, wherein the memory further stores computer-executable instructions that cause the processor to:

transmit the unique vehicle identifier with the third-party system associated with the unique vehicle identifier;

receive driver information from the third-party system; and determine the driver account of the driver based at least in part on the driver information received from the third-party system.

6. The intermediary system of claim 1, wherein receiving the encounter identifier further includes receiving an image of a vehicle having a vehicle identifier.

7. The intermediary system of claim 1, wherein the location information includes one or more coordinate location of the officer device.

8. The intermediary system of claim 1, wherein the memory further stores computer-executable instructions that cause the processor to:

receive one or more notification from the driver indicative of the device location and initiation of the encounter.

9. The intermediary system of claim 1, wherein the memory further stores computer-executable instructions that cause the processor to:

cause a user device to generate one or more of an audio feed and a video feed; and receive one or more of the generated audio feed and the generated video feed from the user device.

10. The intermediary system of claim 9, wherein the user device is associated with the officer device and wherein receiving one or more of the generated audio feed and the generated video feed includes receiving, from the officer device, one or more of the generated audio feed and the generated video feed.

11. The intermediary system of claim 9, wherein the user device is associated with the driver device and wherein receiving one or more of the generated audio feed and the generated video feed includes receiving, from the user device, one or more of the generated audio feed and the generated video feed.

12. The intermediary system of claim 1, wherein the driver response further includes one or more medical information, including one or more of a real-time heartrate, a current heartrate, and a medical alert.

13. The intermediary system of claim 12, wherein the memory further stores computer-executable instructions that cause the processor to:

cause the officer device to output the one or more medical information, including the medical alert.

14. The intermediary system of claim 13, wherein the memory further stores computer-executable instructions that cause the processor to:

cause the officer device to output an auditory alert based on the medical alert.

15. The intermediary system of claim 13, wherein the memory further stores computer-executable instructions that cause the processor to:

cause the officer device to output a visible alert based on the medical alert.

16. The intermediary system of claim 13, wherein the memory further stores computer-executable instructions that cause the processor to:

request an acknowledgement from the officer that the officer has received notice of the one or more medical information prior to transmitting the driver profile associated with the driver.

17. The intermediary system of claim 1, wherein the memory further stores computer-executable instructions that cause the processor to:

transmit, to the officer device, one or more quick response based at least in part on the context information.

18. The intermediary system of claim 1, wherein the memory further stores computer-executable instructions that cause the processor to:

transmit, to the driver device, an informational screen including one or more of an officer name, an officer badge number, an officer title, an officer rank, and an officer image.

19. The intermediary system of claim 1, wherein the memory further stores computer-executable instructions that cause the processor to:

display, on the driver device, one or more option comprising one or more of an option to quick-dial a police department of the officer, an option to quick-dial 9-1-1, an option to quick-dial an attorney or attorney service, and an option to quick-dial a predetermined contact.

20. The intermediary system of claim 1, wherein the memory further stores computer-executable instructions that cause the processor to:

display, on the driver device, an encounter questionnaire having one or more encounter question regarding the encounter; and receive, from the driver device, an encounter questionnaire response to one or more of the one or more encounter question.

* * * * *